United States Patent [19]

Prince et al.

[11] 4,305,901

[45] Dec. 15, 1981

[54] WET EXTRUSION OF REINFORCED THERMOPLASTIC

[75] Inventors: David S. Prince, Buffalo; Walter E. Voisinet, Colden, both of N.Y.

[73] Assignee: National Gypsum Company, Dallas, Tex.

[21] Appl. No.: 809,739

[22] Filed: Jun. 24, 1977

Related U.S. Application Data

[63] Continuation-in-part of Ser. No. 381,271, Jul. 23, 1973, abandoned.

[51] Int. Cl.³ .............................................. B29F 3/08
[52] U.S. Cl. ........................ 264/176 R; 260/29.4 UA; 260/29.6 NR; 260/29.6 R; 264/148; 264/177 R; 264/211; 264/234; 264/236; 264/331.19; 264/347
[58] Field of Search ................. 264/234, 68, 101, 148, 264/177 R, 176 R, 211, 236, 347; 260/29.4 UA, 29.6 NR, 29.6 R

[56] References Cited

U.S. PATENT DOCUMENTS

| | | | |
|---|---|---|---|
| 2,935,763 | 5/1960 | Newman et al. | 264/101 |
| 3,219,467 | 11/1965 | Redican et al. | 264/176 R |

*Primary Examiner*—Jeffery R. Thurlow
*Attorney, Agent, or Firm*—Robert F. Hause

[57] ABSTRACT

A method is described for the extrusion of a mixture of a water-based latex emulsion, fibers and fillers.

10 Claims, No Drawings

WET EXTRUSION OF REINFORCED THERMOPLASTIC

This is a continuation-in-part of our copending application, Ser. No. 381,721, filed July 23, 1973 now abandoned.

This invention relates to a novel process for extruding rigid plastic products and particularly to extruding an aqueous mixture of latex, reinforcing fibers and fine filler material.

The usual extrusion processes for forming elongate plastic articles involves the heating and softening of a relatively pure, water-free plastic, followed by the forced compaction and then the ejection through a die of the heated, softened material. These materials are relatively pure plastics in that, compared to the present invention, very little of the low cost fillers and extenders for plastics can be used. They are water-free at least to the extent that no water is intentionally added or included.

This prior hot extrusion of plastics is normally carried out at a speed of only about 2 to about 15 lineal feet/minute.

In the present invention, an extruder, which optionally could be one with no heating elements, is able to extrude a substantially lower cost plastic product at a machine speed of from about 50 to about 200 lineal feet per minute, producing a product of high quality and good characteristics. This has been accomplished by employing an aqueous latex emulsion mixed with fibers and fillers.

It is an object of the present invention to provide a novel method for forming elongate plastic articles.

It is a further object to provide a simplified method for extruding plastics.

It is a still further object to provide a method for extruding articles of markedly lower raw materials cost, at markedly lower equipment cost and at markedly increased production speeds.

These and other objects and advantages of the invention will be more readily apparent when considered in relation to the preferred embodiments as set forth in the following specification.

The method of the invention consists essentially of feeding a mixture of latex emulsion, fiber and fillers to an extruder, extruding the mixture through a die having a predesigned opening or orifice, supporting the extruded product, and drying and curing the extruded product.

EXAMPLE I

An extrudable mixture is made from 58⅓ parts (all parts by weight) of vinyl chloride copolymer latex emulsion of 57% solids, such as Geon 460×7, a product of B. F. Goodrich, 33⅓ parts #7 asbestos and 33⅓ parts clay. The ingredients are thoroughly mixed in a Muller Mixer for approximately 15 minutes. In this example the latex emulsion is defined as having a water content equal to the water content of the latex as purchased plus the additional water added to provide the desired finished consistency of mixture. Latex emulsions with higher percentage solids may be used with additional water added separately. The preferred order of mixing ingredients is to mix the fiber with the liquids first and then add the filler.

The resultant material is then put in a Pug Mill mounted on an F.R.H. PR 9 9-inch extruder. The material passes from the Pug Mill to the extrusion augers. The Pug Mill and the extruder are joined in a way such that the screws in the Pug Mill force the material into the extrusion augers with a force of about 5 psi. Without a slight force greater than the mere force of gravity feeding material to the extrusion augers, there will be occasional voids formed in the end product from the extruder. The extrusion augers force the aqueous mixture out through the opening in an extruding die. The force required to extrude the aqueous mixture will depend on the exact composition of the material and on the size and shape of the extruding die. Compositions and dies used in accordance with the invention will produce the necessity for at least about 25 psi being used to extrude the material, and possibly as much as 5000 psi being needed under some conditions. The extruding die can be of an opening area of no less than about ten square millimeters, in accordance with the invention. The extruder is not heated in any way other than from the friction from feeding and extruding.

The shape of the opening determines the cross-sectional shape of the extruded product. The wet extruded product is immediately supported on a conveyor or smooth table top, as it progresses away from the extruder. The wet extruded endless material is then cut into any desired lengths. The cut, wet product is then placed on rigid sheets or rigid mesh and placed in drying ovens. Drying was done at 200° F. for 1½ hours. The product was then cured at 350° F. for 15 minutes.

EXAMPLE II

An extrudable mixture was made by mixing the following:

|  | TOTAL WEIGHT | DRY WEIGHT |
| --- | --- | --- |
| Vinyl chloride latex (B.F.G. Geon 351) | 58.2 | 32.2 |
| Melamine Formaldehyde (American Cyanamide Cymel 481) | 6.7 | 5.3 |
| Phosphoric Acid catalyst for Melamine formaldehyde | .2 | .2 |
| 6D-1 Asbestos fiber | 30.5 | 30.5 |
| Perlite fines | 30.5 | 30.5 |
| Saran microspheres (Dow Chemical XD-7895) | 3.1 | .4 |
| Polyethylene oxide hydromodifier (Union Carbide Polyox WSR-301) | .9 | .9 |
| Water | 36.9 | |

The total water in this mixture is 40% of the total wet weight. The total water content for the above dry ingredients can be varied from about 25% to 50% of the total wet weight.

The 40% water content was preferred in extruding cooling tower rigid fins. The cooling tower fins had a cross-sectional area of about 0.175 inch by 3½ inches. The cooling tower fins were extruded at a rate of from about 70 to about 90 ft/min. producing about 2400 lbs. of wet extrusion/hour, or 1440 lbs. of dry extrusion/hour.

The use of a small amount of melamine formaldehyde resin in the mixture has been found to alter the characteristics of the final product, providing increased moisture resistance and a slightly increased hardness.

The hydromodifier acts as a lubricant, and also enables the use of additional water in the mix, increasing softness and lowering final dried densities. Following extrusion the fins were dried and cured as described in Example I.

EXAMPLE III

The use of a thermosetting resin along with the thermoplastic resin in the latex, such as in Example II, also accelerates the stiffening of the material immediately after extrusion, and this stiffening can be increased by increasing the temperature of the extruded material, immediately after it is extruded, while it is being extruded or both. An even greater stiffening can be had by using a thermosetting resin such as a polyfunctional isocyanate, as follows:

|  | PARTS BY WEIGHT |
| --- | --- |
| Vinyl chloride copolymer | 41.0 |
| Polymeric isocyanate (Mobay Chemical M R S) | 4.5 |
| #7 Asbestos fiber | 54.4 |
| Water | 45.0 |

EXAMPLES IV-XIII

Other forms of plastic extrudable mixtures can be employed as follows:

|  |  | PARTS BY WEIGHT |
| --- | --- | --- |
| IV. | Acrylic resin | 4.5 |
|  | #7 asbestos fiber | 54.5 |
|  | Clay | 41.0 |
|  | Water | 35.0 |
| V. | Vinyl chloride copolymer | 45.5 |
|  | #7 asbestos fiber | 54.5 |
|  | Water | 45.0 |
| VI. | Vinyl chloride copolymer | 45.5 |
|  | Perlite fines | 27.5 |
|  | Silica | 27.0 |
|  | Water | 25.0 |
| VII. | Vinyl chloride copolymer | 45.5 |
|  | Perlite fines | 27.5 |
|  | Diatomaceous earth | 27.0 |
|  | Water | 30.0 |
| VIII. | Vinyl chloride copolymer | 45.5 |
|  | Perlite fines | 27.5 |
|  | Wood flour | 27.0 |
|  | Water | 30.0 |
| IX. | Vinyl chloride copolymer | 45.5 |
|  | #7 asbestos fiber | 30.5 |
|  | Perlite fines | 23.0 |
|  | Wax emulsion | 1.0 |
|  | Water | 40.0 |
| X. | Vinyl chloride copolymer | 40.5 |
|  | Urea formaldehyde | 5.0 |
|  | #7 asbestos fiber | 30.5 |
|  | Perlite fines | 24.0 |
|  | Water | 40.0 |
| XI. | Vinyl chloride copolymer | 40.5 |
|  | Phenol formaldehyde | 5.0 |
|  | #7 asbestos fiber | 30.5 |
|  | Perlite fines | 24.0 |
|  | Water | 40.0 |
| XII. | Vinyl chloride copolymer | 41.0 |
|  | Butadiene acrylonitrile | 4.5 |
|  | #7 asbestos fiber | 54.5 |
|  | Water | 45.0 |
| XIII. | Vinyl chloride-acetate-ethylene | 40.5 |
|  | Styrene butadiene | 4.5 |
|  | #7 asbestos fiber | 30.5 |
|  | Cellulose fiber | 24.5 |
|  | Water | 40.0 |

The above examples show how the invention is susceptible to considerable variation in the ingredients. Of primary consideration is the presence of an aqueous latex emulsion or a water-dilutable resin along with some filler, which can be fibrous.

Examples of the latex emulsions are vinyl chloride, vinyl chloride acrylic, vinyl chloride ethylene acetate, vinyl acetate ethylene, butadiene acrylonitrile, styrene butadiene, urethane and acrylics. Examples of water-dilutable resins are urea formaldehyde, melamine formaldehyde and phenol formaldehyde. The fibers may be asbestos, waste news, kraft fibers, pressure-refined wood fiber, solka floc and glass fiber. The non-fibrous fillers can be perlite, attapulgus clay, kaolin clay, plastic microspheres, wood flour, diatomaceous earth, vermiculite and a substantially gasoline-insoluble portion of pine wood resin. The water content of the Examples varies from 25% to 45% of the total solids weight, however, with further variations in extruding equipment, extrusion shapes, amount of hydromodifier, etc. it is contemplated that variations may be employed of from 15% to over 100% water, based on total dry solids weight. On a dry basis, the plastic binder can be from about 5% to about 60% of the total weight, the other 40% to 95% being any of the several fillers or fibers, or the equivalents or combinations thereof. Taken individually, the inorganic fillers can be employed at from 0 to about 80% by weight and the fibers can likewise be employed at from 0 to about 80% by weight. A hydromodifier, such as polyethylene oxide, carboxy methyl cellulose, or hydroxy ethyl cellulose can be added to any of the formulations above, if desired, with a consequent adjustment in the amount of water used.

After thorough mixing, the mixture in each example was forced through a suitable extrusion die which has been carefully machined, as is known in the art, in order to perform in producing a uniform elongate rigid extrusion of a desired final cross-section.

The extrusion is then dried. It may be dried at room temperature or at a raised temperature which is lower than that temperature which would adversely affect the particular plastic employed, if so heated before reasonably dry. After the extrusion is substantially dry, it will be necessary in the case of most organic binders to treat the extrusion further sufficient to fuse or cure the plastic component.

The above examples have involved extruding a mixture which has not been heated to any substantial degree prior to extrusion. It has been found that a slight amount of heating of the mixture can be advantageous in that the extruded material can be converted to a relatively dry and a relatively self-supporting rigid condition substantially quicker. In this respect, a temperature of about 212° F. results in a very rapidly drying product of the extrusion.

Having completed a detailed disclosure of the preferred embodiments of our invention, so that others may practice the same, we contemplate that variations may be made without departing from the essence of the invention.

We claim:

1. The method of making elongate, extruded thermoplastic products comprising the steps of mixing together (1) thermoplastic resin, (2) fine inert material and (3) water, the quantities of such additives being such that from about 5% to about 60% of the solids is thermoplastic resin, from about 40% to about 95% of the solids is fine inert material and the amount of water is such that the mixture has an extrudable consistency, forcing the mixture through an opening in a machined extrusion die with a pressure of at least about 25 psi forming a uniform elongate extrusion of the extruded material, of a cross-section determined by said die cross-section, drying said elongate member and fusing said thermoplastic resin.

2. The method of claim 1 wherein said uniform elongate extrusion is rigid, after said drying and fusing.

3. The method of claim 1 wherein said mixture is forced into an extruder with pressures of at least about 5 psi prior to its being forced at substantially higher pressures through a machined extrusion die.

4. The method of claim 1 wherein said machined extrusion die opening has a cross-sectional area of at least about 10 square millimeters.

5. The method of claim 4 wherein said uniform elongate extrusion is rigid, after said drying and fusing.

6. The method of claim 1 wherein said thermoplastic resin is a vinyl chloride which is added to the mixture in the form of an aqueous latex emulsion.

7. The method of claim 1 wherein said inert material includes fibrous matter.

8. The method of claim 1 wherein said mixture further comprises a minor amount of a thermosetting resin, said thermosetting resin being cured during said fusing of said thermoplastic resin.

9. The method of claim 8 wherein said thermosetting resin is a polymeric isocyanate.

10. The method of claim 1 wherein the amount of water in the mixture equals from about 15% to about 100% of the total solids weight of the mixture.

* * * * *